United States Patent Office 3,541,116
Patented Nov. 17, 1970

3,541,116
3,5-DI-SUBSTITUTED FUCHSONES
Hans-Dieter Becker, Schenectady, N.Y., assignor to General Electric Company, a corporation of New York
No Drawing. Filed Sept. 13, 1966, Ser. No. 579,008
Int. Cl. C09g 11/06
U.S. Cl. 260—389                                   7 Claims

ABSTRACT OF THE DISCLOSURE

Novel fuchsones having the formula

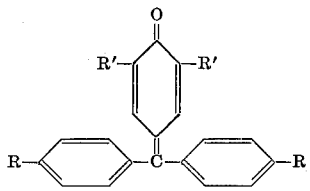

where each R has no more than 8 carbon atoms and is independently selected from the group consisting of hydrogen, hydroxyl, halogen, alkyl, aryl, alkoxycarbonyl, acyloxy and hydrocarbonoxy and each R' has from 1 to 8 carbon atoms and is independently selected from the group consisting of aryl and primary and secondary alkyl and, in addition, tertiary alkyl and alkoxy when R is other than hydrogen are prepared by photochemical or synthetic chemical techniques. Since the fuchsones are highly colored they may be used as dyes or they may be used as intermediates in the process of making bisphenols or hindered phenols.

---

This invention relates to certain novel fuchsones. The photochemical process of producing some of these materials is claimed in my divisional application, Ser. No. 15,968, filed on or about Feb. 27, 1970. Within the class of quinone methides, fuchsones are of particular interest because of their early application as triphenylmethane dyes. Fuchsones are stable crystalline compounds which are different from most other quinone methides produced as non-isolable reactive intermediates in the oxidation of certain phenols. The parent compound has been known for many years, and numerous substituted fuchsones have been described in the literature. They are generally prepared either by elimination of water from 4-hydroxytriphenylcarbinols, which are prepared by a Grignard reaction, or by oxidation of substituted 4-hydroxytriphenylmethanes, which are in turn prepared by the acid-catalyzed condensation of phenols with aldehydes. These prior methods have been dependent on having the proper starting materials available and are only capable of producing fuchsones in which at least two of the three rings have identical substituents since the rings are those of the phenol reactant. Furthermore, these prior art methods were limited to those starting materials which did not have other substituents which were reactive under the reaction conditions.

In my copending application Ser. No. 578,987, filed concurrently herewith, and assigned to the same assignee as the present invention, I have disclosed and claimed a photochemical reaction whereby fuchsones are reacted with phenols to produce 4,4' - dihydroxytetraphenylmethanes (bisphenols) having various substituents other than the hydroxyl groups on the aryl nuclei. This method allows bisphenols to be prepared in which all four phenyl groups have different substituents so that the bisphenols produced are racemic mixtures of optically active phenols. In order to produce these racemic mixtures, it is necessary to use fuchsones in which the substituents on any one of the three rings are different from, or in different ring positions than the substituents on any one of the other two rings. My reaction is also applicable to the use of fuchsones in which the substituents on at least two of the rings are the same to produce other new and useful bisphenols. The present application and its above-mentioned divisional application relates to the photochemical process of producing fuchsones and the new fuchsones which are useful for making bisphenols by the method of my above-identified copending application. Some of these new fuchsones would be difficult if not impossible to make by the prior art processes.

These new fuchsones have the general formula

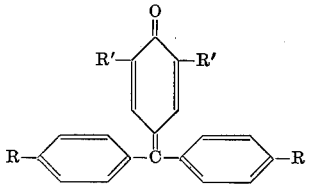

where each R is independently selected from the group consisting of hydrogen, hydroxyl, halogen, alkyl, aryl, alkoxycarbonyl, acyloxy and hydrocarbonoxy and each R' is independently selected from the group consisting of aryl and primary and secondary alkyl and, in addition, tertiary alkyl and alkoxy when R is other than hydrogen.

These products are sometimes named as substituted α,α-diphenyl-1,4-benzoquinone methides or as substituted 2,5-cyclohexadiene-1-ones. However, in this application, because it simplifies the naming of the various compounds of this invention, they will be named as substituted fuchsones using the numbering system shown below to designate the positions of the substituents.

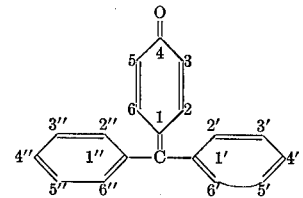

In addition to hydrogen, hydroxyl and halogen, i.e., fluorine, chlorine, bromine, iodine specifically named above, R may be alkyl, aryl, alkoxycarbonyl, i.e.,

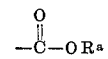

where $R^a$ is alkyl, including cycloalkyl and aralkyl; acyloxy, i.e.,

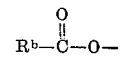

where $R^b$ is alkyl, including cycloalkyl and aralkyl, or aryl, including alkaryl; and hydrocarbonoxy, i.e., $R^c$—O— where $R^c$ is an aliphatic hydrocarbon, (i.e., alkyl, alkenyl and alkynyl) including cycloaliphatic and aryl substituted aliphatic hydrocarbon or aromatic hydrocarbon including aliphatic substituted aromatic hydrocarbon. Preferably R', $R^a$, $R^b$, and $R^c$ have from 1 to 8 carbon atoms but may have as many as 30 or more carbon atoms.

Typical examples of alkoxycarbonyl which R may be are: methoxycarbonyl, ethoxycarbonyl, propoxycarbonyl, butoxycarbonyl, hexoxycarbonyl, cyclohexoxycarbonyl, octoxycarbonyl, triacontoxycarbonyl, etc. Typical examples of acyloxy which R may be are: acetoxy, phenylacetoxy, propionoyloxy, butanoyloxy, octanoyloxy, triacontonoyloxy, benzoyloxy, methylbenzoyloxy, toluoyloxy, naphthoyloxy, ethylbenzoyloxy, etc. Typical examples of hydrocarbonoxy which R also may be are: alkoxy, which R' may be, e.g., methoxy, ethoxy, propoxy, butoxy, hexoxy, cyclohexoxy, phenoxy, toloxy, xyloxy, phenylethoxy, benzoxy, methylbenzoxy, etc., and, in addition alkenoxy and alkynoxy, for example, vinoxy, alloxy, crotoxy, propargyloxy, (2-propynoxy) etc. Typical examples of aryl which R and R' may be, are phenyl, tolyl, xylyl, naphthyl, methylnaphthyl, ethylphenyl, propylphenyl, diethylphenyl, etc. Examples of alkyl which R and R' may be are the primary, secondary and tertiary alkyl groups, e.g., methyl, ethyl, propyl, isopropyl, butyl, sec-butyl, t-butyl, the various amyl isomers, the various hexyl isomers, up to those alkyl groups having as many as 30 or more carbon atoms, e.g., triacontyl, and including the cycloaliphatic and aryl substituted aliphatic, e.g., cyclohexyl, methylcyclohexyl, ethylcyclohexyl, benzyl, naphthylmethyl, phenylethyl, methylbenzyl, ethylbenzyl, phenylpropyl, etc.

Those fuchsones in which R' in the above formula are secondary or tertiary alkyl are conveniently made by my novel photochemical reaction claimed in the above-mentioned divisional application in which a 2,6-disubstituted phenol, wherein the substituents are secondary or tertiary alkyl groups as disclosed above for R', is reacted with a benzophenone having the formula

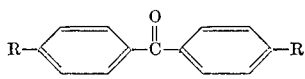

where R is as defined above in the formula for the fuchsones. The reaction between the phenol and the benzophenone is a photochemical reaction which is carried out in the substantial absence of oxygen and without the application of heat using light having a wavelength in the range of 300 to 500 m$\mu$, but not substantially below 300 m$\mu$. The phenol and the benzophenone are dissolved in an acid free acetone solution. The primary product formed by the reaction of the phenol with the benzophenone is a triphenyl carbinol having the formula

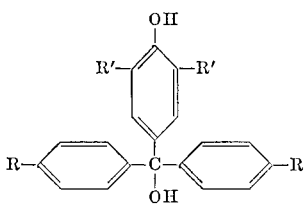

where R' and R are those substituents defined above for the fuchsones. At this point, the acetone is evaporated and the carbinol dissolved in methanol. Upon acidification of the solution with a mineral acid, e.g., hydrochloric acid, sulfuric acid, nitric acid, the carbinol is converted to the fuchsone which precipitates from the methanol solution. The fact that the acid converts the carbinol to the fuchsone is the reason the acetone must be acid-free, since if acid were present the carbinol product would be converted to the fuchsone at this point, which then can be involved in photosensitized side reactions. However, after the irradiation is stopped, it of course would be possible to acidify the acetone solution, evaporate off the acetone and then dissolve the unreacted phenol and the benzophenone with methanol, leaving behind the fuchsone product, which is then easily removed by filtration, but the acidification of the methanol solution is preferable. If the substituents on the phenol of the benzophenone would produce acidic material during irradiation, a base, e.g., ammonium hydride, should be present to neutralize the acidic material. Bromo and iodo, but not chloro substituents require the use of base.

In order to suppress side reactions, the wavelengths of the radiation should be such that light is absorbed by the benzophenone but not by either the product, the initial phenol or the solvent. To meet these criteria, the wavelengths of the light should include the range of 300–500 m$\mu$, but not substantially below 300 m$\mu$. The triphenylcarbinol intermediate, phenol, and the acetone used as a solvent all absorb in the region of 280 m$\mu$ and below. The wavelengths of the light may include those greater than 500 m$\mu$, but preferably the greatest proportion of the wavelengths are in the cited range.

The solvent must be a liquid capable of dissolving the starting phenol and the benzophenone. Furthermore, it likewise must not absorb in the region of the wavelengths of light used. The solvent used must likewise be inert to both of the reactants, and the final product. Methanol is acidic enough that it converts some of the triphenylcarbinol to the fuchsone which then reacts with some of the phenol as disclosed in my above-identified copending application. However, this is not the only reaction, except when the phenol is 2,6-di-t-butylphenol, since the methanol is also reactive with the benzophenone. The only solvent which I have found satisfactory is acetone. However, any other solvent, which meets the above requirements, could be used in place of acetone.

A convenient source of light to be used for irradiating the solution is obtained by using an ultraviolet light and passing it through a filter, for example, Pyrex glass, which will filter out all light of wavelengths below 300 m$\mu$. Alternatively, irradiation from any appropriate source may be used keeping in mind that the actual range of wavelengths used should include the wavelengths which are absorbed by the particular benzophenone. The radiation source is preferably chosen to contain the greatest amount possible of the wavelengths which are absorbed by the benzophenone, but not by the other components of the reaction mixture. This is because only the light absorbed by the benzophenone is utilized in promoting the reaction. When using any of above benzophenones, ultraviolet light from a mercury vapor quartz lamp filtered through Pyrex glass is very satisfactory for process.

The progress of the benzophenone reaction is easily monitored by withdrawing a small sample and determining when the concentration of phenol becomes constant. This is conveniently done by gas chromatography. The irradiation may be continued for 24 hours with no adverse effect, although in general the reaction is completed in about 4 hours in the equipment used in the examples, as shown by the amount of phenol in the reaction mixture becoming essentially constant at that time. The total time is dependent on the actual quantity of light absorbed since one quantum of light must be absorbed for each molecule of the benzophenone reacted. For highest utilization of the radiation, it should be completely absorbed by the benzophenone. For highest overall conversion of the phenol and the benzophenone to the triphenyl carbinol it is preferable to stop the irradiation at about 40–50% conversion, isolate the triphenyl carbinol and recycle the recovered phenol and benzophenone.

For as yet some unknown reason, the photochemical process is not suitable for making fuchsones in good yields from phenols in which the substituents in the 2 and 6 position are primary alkyl or aryl as disclosed above for R'. It is believed that these phenols do react to form the triphenyl carbinol, but, on acidification, the carbinol only forms the triphenylmethyl cation but does not go readily to the fuchsone. For the preparation of such fuchsones, a chemical method is used whereby the phenol, as disclosed above, is reacted with a benzhydrol having the formula

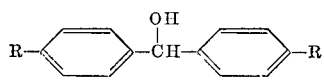

where R is as defined above for the benzophenone. It will be readily recognized that the benzhydrols are the reduced form of the benzophenone.

This reaction is carried out in an acetic acid solution, in the presence of a small amount of mineral acids, such as sulfuric acid to produce the corresponding triphenylmethanes. These triphenylmethanes are readily oxidized in solution with oxidizing agents, such as manganese dioxide, nickel peroxide, lead dioxide, peroxides, etc. to the corresponding fuchsone.

The phenols which can be used in this method are the same phenols mentioned above which can be used in the photochemical process. The benzhydrols, which can be used, correspond to the benzophenones outlined above, except that the benzhydrols are usually formed by reduction of the corresponding benzophenone with a reducing agent which limits benzhydrols to those having substituents which would not have been reduced or are the reduction product of these substituent groups. Such substituent groups also can not be reactive under the reaction conditions forming the triphenylmethane nor be oxidized by the oxidizing agent used in oxidizing the triphenylmethane to the fuchsone, i.e., a hydroxyl substituent as in producing a 4'- or 4',4''-dihydroxy substituted fuchsone. However, for the benzyhydrols which can be used in this reaction, the reaction to produce the triarylmethane as well as the oxidation reaction to produce the fuchsone are both high yield reactions, so that the overall yield is quite high. Those fuchsones which can not be made by this process are very conveniently made by my photochemical reaction.

In order that those skilled in the art may better understand my invention, the following examples are given by way of illustration and not by way of limitation. In all of the examples, all parts and percentages are by weight unless stated otherwise. In the elemental analysis of the products, the values given are in percent. The theoretical values for the analyses and molecular weights are given in parentheses following the determined values.

GENERAL PROCEDURE

The general procedure utilized in the following examples was to prepare a solution of the particular phenol and benzophenone in acetone, purge the solution with argon then irradiate the solution cooled to 18° C. At the end of the irradiation period, the acetone was evaporated under reduced pressure and the residue dissolved in methanol which was then acidified with hydrochloric acid to precipitate the fuchsone product which was then removed by filtration and recrystallized.

The light source used was a 100 watt mercury vapor lamp, General Electric type H–100 A4/T, from which the glass jacket had been removed, leaving only the quartz envelope. This was surrounded by a Pyrex glass tube assembled to allow water cooling. The lamp and Pyrex glass jacket were surrounded by a vessel to contain reaction mixture.

EXAMPLE 1

Using the general procedure, a solution of 2.06 g. of 2,6-di-t-butylphenol and 0.98 g. of 4-methylbenzophenone in 100 ml. of acetone was irradiated for 5 hours. The light yellow solution was evaporated under reduced pressure leaving the 3,5-di-t-butyl-4-hydroxy-4'-methyltriphenylcarbinol unreacted starting materials as a yellow oily residue which was dissolved in 20 ml. of methanol and acidified with one drop of concentrated hydrochloric acid dissolved in 1 ml. of methanol. The yellow crystals of the fuchsone thus formed were removed by filtration and recrystallized by dissolving in chloroform and adding methanol. A yield of 1,1 g. of 2,5-di-t-butyl-4'-methylfuchsone was obtained having a melting point of 203–204° C.

In the same manner as described in Example 1, the following fuchsones were prepared.

EXAMPLE 2

A solution of 1.05 g. of 4,4'-dimethylbenzophenone and 2.06 g. of 2,6-di-t-butylphenol in 100 ml. of acetone was irradiated 10 hours to give 0.82 g. of 3,5-di-t-butyl-4',4''-dimethylfuchsone, melting first at 190° C., but resolidifying and then melting at 195–196° C.

EXAMPLE 3

A solution of 1.08 g. of 4-chlorobenzophenone and 1.53 g. of 2,6-di-t-butylphenol in 55 ml. of acetone was irradiated for 4 hours to give 1.01 g. of 3,5-di-t-butyl-4'-chlorofuchsone having a melting point of 201–202° C.

EXAMPLE 4

A solution of 1.255 g. of 4,4'-dichlorobenzophenone and 2.06 g. of 2,6-di-t-butylphenol in 100 ml. of acetone was irradiated for 16 hours to give 1.1 g. of 3,5-di-t-butyl-4',4''-dichlorofuchsone having a melting point of 223–224° C.

EXAMPLE 5

A solution of 1.305 g. of 4-bromobenzophenone and 2.06 g. of 2,6-di-t-butylphenol in 75 ml. of acetone containing 0.2 ml. of concentrated aqueous ammonium hydroxide was irradiated 3 hours to produce 1.46 g. of 3,5-di-t-butyl-4'-bromofuchsone having a melting point of 209–210° C. In this example, the ammonium hydroxide was necessary because of the bromine substituent on the benzophenone which upon irradiation produces a slight amount of HBr.

EXAMPLE 6

A solution of 1.98 g. of 4-hydroxybenzophenone and 4.12 g. of 2,6-di-t-butylphenol in 150 ml. of acetone was irradiated for 27 hours to produce 2.0 g. of 3,5-di-t-butyl-4'-hydroxyfuchsone which first melts at 248–250° C. then resolidifies and melts at 258–260° C.

EXAMPLE 7

A solution of 1.21 g. of 4,4'-dimethoxybenzophenone and 2.06 g. of 2,6-di-t-butylphenol in 60 ml. of acetone was irradiated for 4 hours to produce 0.8 g. of 3,5-di-t-butyl-4',4''-dimethoxyfuchsone having a melting point of 180° C.

EXAMPLE 8

A solution of 1.45 g. of 4,4'-dipropargyloxybenzophenone and 2.06 g. of 2,6-di-t-butylphenol in 60 ml. of acetone was irradiated for 14 hours to produce 1.05 g. of 3,5-di-t-butyl-4,4'-di-propargyloxyfuchsone having a melting point of 141–142° C. In this reaction, 1 ml. of ammonium hydroxide was present as a precautionary measure, since there was a possibility that some acid might be present in the 4,4'-dipropargyloxybenzophenone because of the method of its preparation.

EXAMPLE 9

A solution of 1.49 g. of 4,4'-diacetoxybenzophenone and 2.06 g. of 2,6-di-t-butylphenol in 75 ml. of acetone was irradiated for 11 hours to produce 1.53 g. of 3,5-di-t-butyl-4',4'''-diacetoxyfuchsone having a melting point of 262–263° C.

It will be recognized that in this example the 4,4'-diacetoxybenzophenone is the diacetate derivative of 4,4'-dihydroxybenzophenone which itself has been used in place of the diacetate derivative, but the yields were lower. Since the above diacetate derivative of the fuchsone can be hydrolyzed after the formation of the fuchsone to produce the corresponding dihydroxyfuchsone and because the yields are higher in the irradiation step, it is preferable to use the diacetate derivative of the 4,4'-dihydroxybenzophenone. The following example illustrates the hydrolysis step.

EXAMPLE 10

A suspension of 2.43 g. of 3,5-di-t-butyl-4',4''-diacetoxybutylfuchsone, prepared as above, in 75 ml. of methanol containing 3 ml. of concentrated aqueous hydrochloric acid was refluxed with stirring for 4 hours. Concentration of this solution produced a precipitate which after recrystallization from methanol gave 2.0 g. of 3,5-di-t-butyl-4',4''-dihydroxyfuchsone having a melting point of 324–325° C.

EXAMPLE 11

A solution of 2.11 g. of 4,4'-dibenzoyloxybenzophenone and 2.06 g. of 2,6-di-t-butylphenol in 100 ml. of acetone was irradiated for 28 hours to give 1.2 g. of 3,5-di-t-butyl- 4',4''-benzoyloxyfuchsone having a melting point of 284–285° C.

EXAMPLE 12

A solution of 1.2 g. of 4-methoxycarbonylbenzophenone and 2.06 g. of 2,6-di-t-butylphenol in 60 ml. of acetone was irradiated for 5 hours to yield 1.16 g. of 3,5-di-t-butyl-4'-methoxycarbonylfuchsone having a melting point of 187–188° C.

EXAMPLE 13

A solution of 1.82 g. of benzophenone and 3.05 g. of 2,6-diisopropylphenol in 150 ml. of acetone was irradiated for 16 hours yielding 1.3 g. of 3,5-diisopropylfuchsone having a melting point of 171–172° C.

EXAMPLE 14

A solution of 0.98 g. of 4-methylbenzophenone and 1.78 g. of 2,6-diisopropylphenol in 60 ml. of acetone was irradiated for 8 hours to yield 0.75 g. of 3,5-diisopropyl-4'-methylfuchsone which first melted at 159–160° C., but then resolidified and melted at 164–165° C.

EXAMPLE 15

A solution of 1.82 g. of benzophenone and 2.58 g. of 2,6-dicyclohexylphenol in 60 ml. of acetone was irradiated for 11 hours to yield 1.45 g. of 3,5-dicyclohexylfuchsone having a melting point of 238–240° C.

EXAMPLE 16

A solution of 0.98 g. of 4-methylbenzophenone and 2.58 g. of 2,6-dicyclohexylphenol in 60 ml. of acetone was irradiated for 4½ hours to yield 1.1 g. of 3,5-dicyclohexyl-4'-methylfuchsone having a melting point of 209–210° C.

EXAMPLE 17

A solution of 1.05 g. of 4,4'-dimethylbenzophenone and 1.54 g. of 2,6-dimethoxyphenol in 100 ml. of acetone was irradiated for 16 hours to yield 0.25 g. of 3,5-dimethoxy-4',4''-dimethylfuchsone having a melting point of 230° C.

The following Table I gives the analytical data and molecular weights determined for the above fuchsones.

TABLE I

| Example | C | H | M.W. |
|---|---|---|---|
| 1 | 87.25 (87.45) | 8.49 (8.39) | 379 (384.60) |
| 2 | 87.53 (87.39) | 8.48 (8.60) | 388 (398.60) |
| 3 | 80.30 (80.08) | 7.17 (7.22) | 413 (404.99) |
| 4 | 73.84 (73.08) | 6.47 (6.42) | 429 (439.43) |
| 5 | 72.20 (72.16) | 6.67 (6.50) | 435 (449.44) |
| 6 | 84.04 (83.90) | 7.78 (7.82) | 383 (386.54) |
| 7 | 80.66 (80.90) | 7.91 (7.96) | 424 (430.60) |
| 8 | 82.89 (82.81) | 7.31 (7.16) | 458 (478.64) |
| 9 | 76.59 (76.52) | 7.21 (7.04) | 465 (486.62) |
| 10 | 80.59 (80.56) | 7.68 (7.51) | 422 (402.54) |
| 11 | 80.87 (80.63) | 6.38 (6.27) | 582 (610.76) |
| 12 | 81.46 (81.27) | 7.52 (7.53) | 416 (428.55) |
| 13 | 87.52 (87.68) | 7.65 (7.65) | 350 (342.49) |
| 14 | 87.33 (87.60) | 7.99 (7.92) | 358 (356.52) |
| 15 | 88.29 (88.10) | 8.11 (8.11) | 422 (422.62) |
| 16 | 88.10 (88.03) | 8.31 (8.31) | 431 (436.65) |
| 17 | 79.48 (79.74) | 6.45 (6.40) | 345 (346.43) |

The following examples illustrate the chemical method of making the fuchsones, by first making the corresponding 4-hydroxytriphenylmethanes.

EXAMPLE 18

To a stirred solution of 4.12 g. of 2,6-di-t-butylphenol and 4.88 g. of 4,4'-dimethoxybenzhydrol in 50 ml. of acetic acid, 1.2 ml. of concentrated sulfuric acid was added dropwise. After no more precipitate was formed, approximately 1 hour, the solution was filtered and the precipitate washed with dilute methanol. The precipitate of 3,5-di-t-butyl-4-hydroxy-4',4''-dimethoxytriphenylmethane weighing 8.1 g. was obtained at colorless crystals having a melting point of 125–126° C. Recrystallization from methanol did not raise the melting point.

EXAMPLE 19

A suspension of 43 g. of active manganese dioxide in a solution of 4.32 g. of the 3,5-di-t-butyl-4-hydroxy-4',4''-dimethoxytriphenylmethane, prepared as in Example 18, in 100 ml. of benzene was stirred for 3 hours at room temperature. After filtering off the manganese dioxide and evaporation of the filtrate under reduced pressure and recrystallization from a mixture of acetone and methanol, there was obtained 3.3 g. of 3,5-di-t-butyl-4',4''-dimethoxyfuchsone having a melting point of 180° C. This material showed no depression in melting point when mixed with the identical fuchsone prepared in Example 7.

EXAMPLE 20

Using the method of Example 18, 5 ml. of concentrated sulfuric acid was added dropwise to a warm (50° C.) stirred solution of 6.10 g. of 2,6-xylenol and 9.2 g. of benzhydrol in 50 ml. of acetic acid to yield 13 g. of 4-hydroxy-3,5-dimethyltriphenylmethane having a melting point of 129–130° C.

EXAMPLE 21

Using the method of Example 18, 1 ml. of concentrated sulfuric acid was added dropwise to a stirred solution of 3.56 g. of 2,6-diisopropylphenol and 3.68 g. of benzhydrol in 20 ml. of acetic acid to yield 6.35 g. of 4-hydroxy-3,5-diisopropyltriphenylmethane having a melting point of 107° C.

EXAMPLE 22

Following the method of Example 18, 3 ml. of concentrated sulfuric acid was added dropwise to a stirred solution of 7.74 g. of 2,6-dicyclohexylphenol and 5.52 g. of benzhydrol in 30 ml. of acetic acid to yield 11.75 g. of 3,5-dicyclohexyl-4-hydroxytriphenylmethane having a melting point of 151–152° C.

EXAMPLE 23

Following the method of Example 18, 2 ml. of concentrated sulfuric acid was added dropwise to a stirred solution of 3.68 g. of 2-methyl-6-phenylphenol and 3.68 g. of benzhydrol in 20 ml. of acetic acid to yield 5.88 g. of 4-hydroxy-3-methyl-5-phenyltriphenylmethane having a melting point of 98–99° C.

EXAMPLE 24

Following the method of Example 18, 10 ml. of concentrated sulfuric acid was added dropwise to a stirred solution of 22.6 g. of 2-t-butyl-6-phenylphenol and 18.4 g. of benzhydrol in 200 ml. of acetic acid to yield 37.0 g. of 3-t-butyl-4-hydroxy-5-phenyltriphenylmethane having a melting point of 153° C.

EXAMPLE 25

Following the method of Example 18, 5 ml. of concentrated sulfuric acid was added dropwise to a warm (60° C.) stirred solution of 6.15 g. of 2,6-diphenylphenol and 4.61 g. of benzhydrol in 50 ml. of acetic acid. After 5 minutes, the reaction mixture solidified, so an additional 25 ml. of acetic acid was added. After 30 minutes, there was obtained 10.0 g. of 4-hydroxy-3,5-diphenyltriphenylmethane having a melting point of 141–142° C.

Analytical data of the triphenylmethanes produced in Examples 18 and 20–25 are shown in Table II.

TABLE II

| Example | C | H | M.W. |
|---|---|---|---|
| 18 | 80.78 (80.52) | 8.39 (8.39) | 414 (432.61) |
| 20 | 87.68 (87.46) | 6.99 (6.99) | 293 (288.40) |
| 21 | 87.32 (87.16) | 8.09 (8.19) | 338 (344.50) |
| 22 | 87.75 (87.69) | 8.65 (8.55) | 423 (424.64) |
| 23 | 88.96 (89.11) | 6.29 (6.33) | 339 (350.47) |
| 24 | 89.05 (88.73) | 7.26 (7.19) | 387 (392.55) |
| 25 | 90.03 (90.26) | 5.77 (5.86) | 415 (412.54) |

Using the triphenylmethanes prepared as described in Examples 20–25, the following fuchsones were prepared following the method of Example 19.

EXAMPLE 26

A solution of 2.88 g. of 4-hydroxy-3,5-dimethyltriphenylmethane in 200 ml. of benzene containing 29 g. of active manganese dioxide, was shaken for 1.5 hours to yield 2.40 g. of 3,5-dimethylfuchsone having a melting point of 200–202° C. This fuchsone showed no depression in melting point with the same compound produced by the photochemical reaction in which a solution of 0.91 g. of benzophenone and 1.22 g. of 2,6-dimethylphenol in 100 ml. of acetone was irradiated for 24 hours. Evaporation of the solvent left an oily residue in which the excess 2,6-dimethylphenol was removed by vacuum sublimation. The residue was dissolved in methanol, but it was only after 2 months standing in an open beaker that a yield of 0.1 g. of the 3,5-dimethylfuchsone was obtained having a melting point of 200–202° C. The analytical data found in Table III is that of the compound produced by the photochemical reaction.

EXAMPLE 27

A solution of 3.445 g. of 4-hydroxy-3,5-diisopropyltriphenylmethane in 200 ml. of benzene containing 34.0 g. of active manganese dioxide, was shaken for 1 hour yielding 3.20 g. of 3,5-diisopropylfuchsone having a melting point of 170–171° C. This compound showed no depression in melting point when mixed with the same fuchsone prepared by the photochemical reaction in Example 13.

EXAMPLE 28

A solution of 5.08 g. of 3,5-dicyclohexyl-4-hydroxytriphenylmethane in 400 ml. of benzene containing 50 g. of active manganese dioxide, was shaken for 3 hours yielding 5.00 g. of 3,5-dicyclohexylfuchsone having a melting point of 238–240° C. which showed no depression in melting point when mixed with the same fuchsone prepared by the photochemical reaction in Example 15.

EXAMPLE 29

A solution of 2 g. of 4-hydroxy-3-methyl-5-phenyltriphenylmethane in 200 ml. of benzene was shaken with 20 g. of nickel peroxide for 30 minutes yielding 1.9 g. of 3-methyl-5-phenylfuchsone. In the same way, a solution of 3.50 g. of 4-hydroxy-3-methyl-5-phenyltriphenylmethane in 200 ml. of benzene containing 35 g. of active manganese dioxide, was shaken for 1 hour yielding 3.20 g. of 3-methyl-5-phenylfuchsone having a melting point of 219° C.

EXAMPLE 30

A solution of 11.76 g. of 3-t-butyl-4-hydroxy-5-phenyltriphenylmethane in 400 ml. of benzene was stirred for 3 hours with 120 g. of nickel peroxide yielding 11 g. of 3-t-butyl-5-phenylfuchsone having a melting point of 209–210° C.

EXAMPLE 31

A solution of 20 g. of 4-hydroxy-3,5-diphenyltriphenylmethane in 200 ml. of benzene was shaken for 25 minutes with 20 g. of nickel peroxide yielding 1.8 g. of 3,5-diphenylfuchsone having a melting point of 295–297° C. which after recrystallization from a boiling chloroformbenzene solution melted at 297–298° C.

In the same manner, the solution of 8.25 g. of 4-hydroxy-3,5-diphenyltriphenylmethane in 400 ml. of benzene was shaken for 6 hours wth 82 g. of active manganese dioxide yielding 7.55 g. of 3,5-diphenylfuchsone having a melting point of 295–297° C.

Analytical data for the above fuchsones which were not identified by their mixed melting points with the same fuchsones prepared by the photochemical reaction are shown below in Table III except that the analytical data for 3,5-dimethylfuchsone is that prepared by the photochemical reaction as mentioned above.

TABLE III

| Example | C | H | M.W. |
|---|---|---|---|
| 26 | 88.21 (88.08) | 6.23 (6.33) | 291 (286.38) |
| 29 | 89.61 (89.62) | 5.59 (5.79) | 313 (348.45) |
| 30 | 89.33 (89.19) | 6.80 (6.71) | 379 (390.53) |
| 31 | 90.78 (90.70) | 5.43 (5.40) | 413 (410.52) |

The active manganese dioxide used in the above examples was prepared according to the method disclosed by Attenburow et al. in J. Chem. Soc., 1094 (1952) and the nickel peroxide was prepared according to the method disclosed by Nakagawa et al. in J. Org. Chem., 27, 1957 (1962).

The fuchsones of this invention have a wide variety of uses, for example, they are highly colored and may be used as dyes. As disclosed above, they also may be used as intermediates in the process of making bisphenols or hindered phenols as disclosed and claimed in my copending application Ser. No. 578,993 filed concurrently herewith and assigned to the same assignee as the present invention. Other uses for the fuchsones will be readily recognized by those who are skilled in the art.

Obviously other modifications and variations of the present invention are possible in the light of the above teachings. Therefore, it is to be understood that changes may be made in the particular embodiments of the invention described which are within the full intended scope of the invention and defined by the appended claims.

What is claimed is:

1. Fuchsones having the general formula

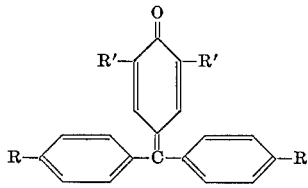

where each R has no more than 8 carbon atoms and is independently selected from the group consisting of hydrogen, hydroxyl, halogen, alkyl, aryl, alkoxycarbonyl, alkylcarbonyloxy, and hydrocarbonoxy and each R' has from 1 to 8 carbon atoms and is independently selected from the group consisting of aryl, primary and secondary alkyl and, in addition, tertiary alkyl and alkoxy when R is other than hydrogen.

2. The fuchsones of claim 1 selected from the group consisting of
   3,5-di-t-butyl-4'-methylfuchsone,
   3,5-di-t-butyl-4',4''-dimethylfuchsone,
   3,5-di-t-butyl-4'-chlorofuchsone,
   3,5-di-t-butyl-4',4''-dichlorofuchsone,
   3,5-di-t-butyl-4'-bromofuchsone,
   3,5-di-t-butyl-4'-hydroxyfuchsone,
   3,5-di-t-butyl-4',4''-dihydroxyfuchsone,
   3,5-di-t-butyl-4'-methoxycarbonylfuchsone,
   3,5-di-t-butyl-4,4'-dimethoxyfuchsone,
   3,5-di-t-butyl-4',4''-dipropargyloxyfuchsone,
   3,5-di-t-butyl-4',4''-diacetoxyfuchsone,
   3,5-di-t-butyl-4',4''-dibenzoyloxyfuchsone,
   3,5-dimethylfuchsone,
   3,5-diisopropylfuchsone,
   3,5-diisopropyl-4'-methylfuchsone,
   3,5-dicyclohexylfuchsone,
   3,5-dicyclohexyl-4'-methylfuchsone,
   3,5-diphenylfuchsone,
   3-phenyl-5-methylfuchsone,
   3-t-butyl-5-phenylfuchsone and
   3,5-dimethoxy-4',4''-dimethylfuchsone.

3. The fuchsone of claim 1 named 3,5-di-t-butyl-4'-hydroxyfuchsone.

4. The fuchsone of claim 1 named 3,5-di-t-butyl-4',4''-dihydroxyfuchsone.

5. The fuchsone of claim 1 named 3,5-di-t-butyl-4',4''-dipropargyloxyfuchsone.

6. The fuchsone of claim 1 named 3,5-di-t-butyl-4'-methoxycarbonylfuchsone.

7. The fuchsone of claim 1 named 3,5-diphenyl-fuchsone.

References Cited

UNITED STATES PATENTS 2,134,247  10/1938  Foldi _____ 260—395

LORRAINE A. WEINBERGER, Primary Examiner

L. A. THAXTON, Assistant Examiner

U.S. Cl. X.R.

204—158; 260—395, 469, 475, 476, 479